Inventors:-
Edwin E. Mallory,
Emerson C. Bryant,

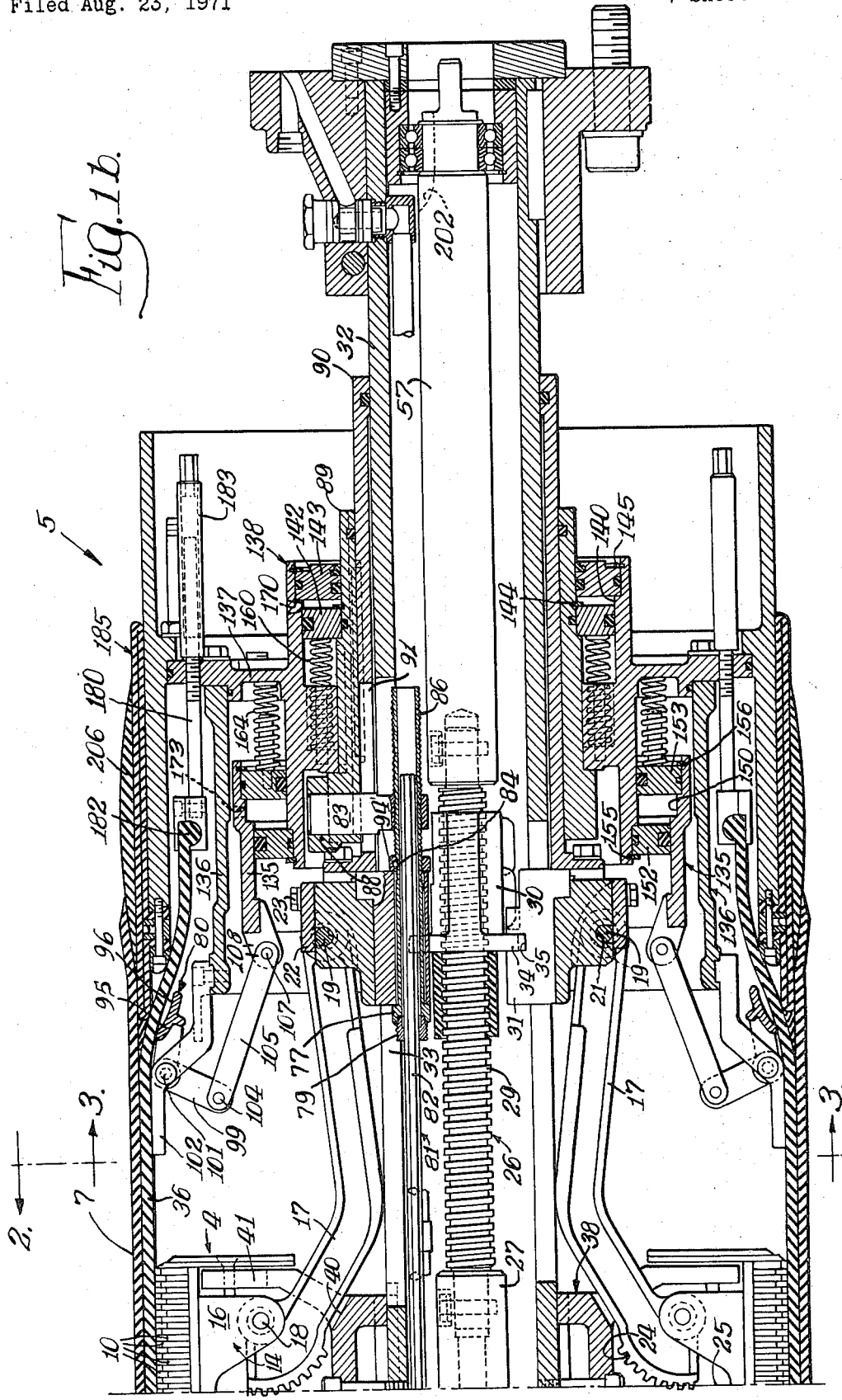

Dec. 4, 1973  E. E. MALLORY ET AL  3,776,802
TIRE BUILDING APPARATUS
Filed Aug. 23, 1971  7 Sheets-Sheet 3
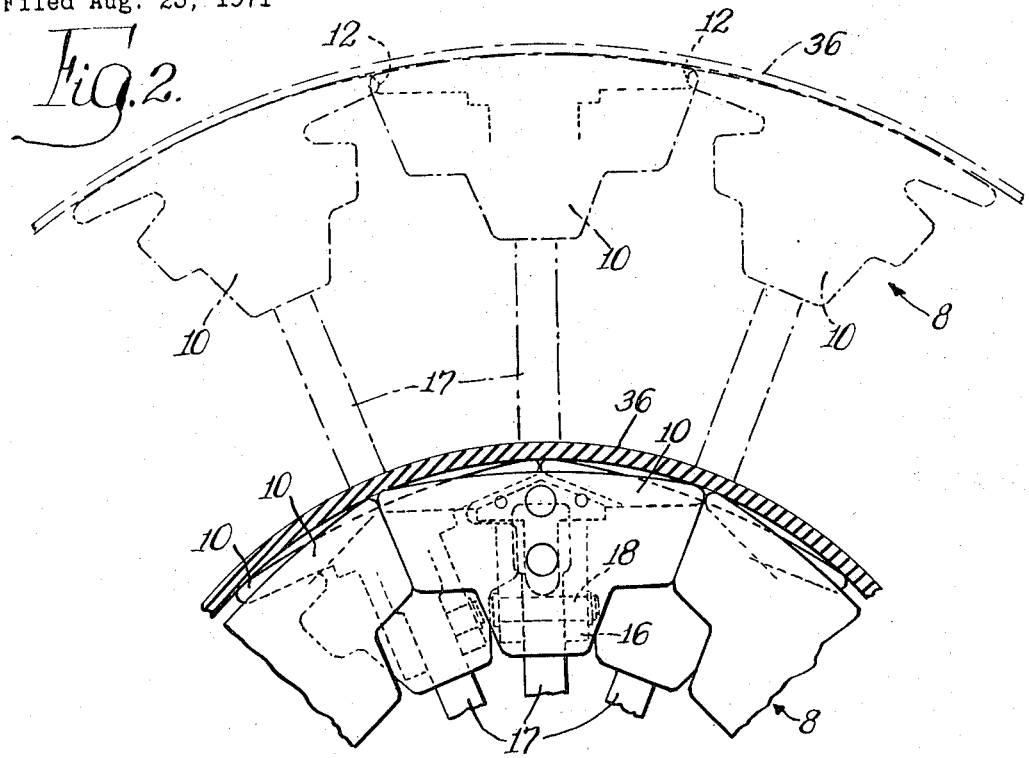
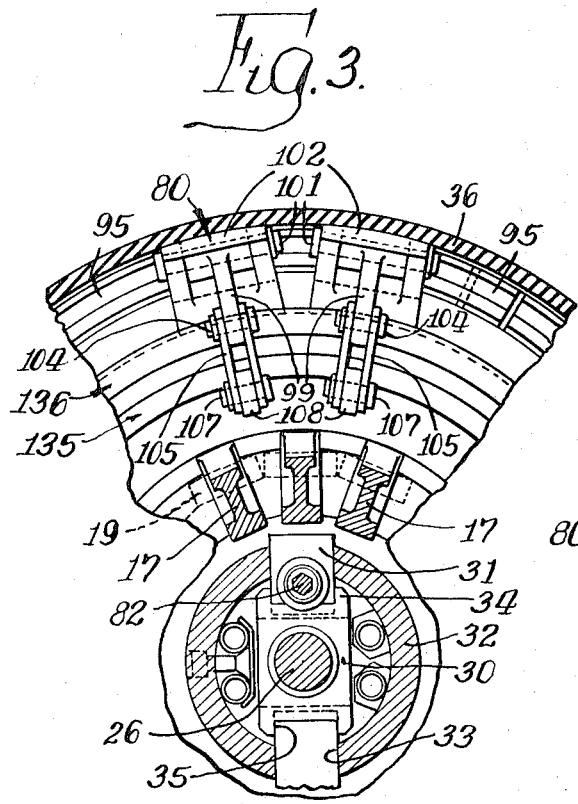
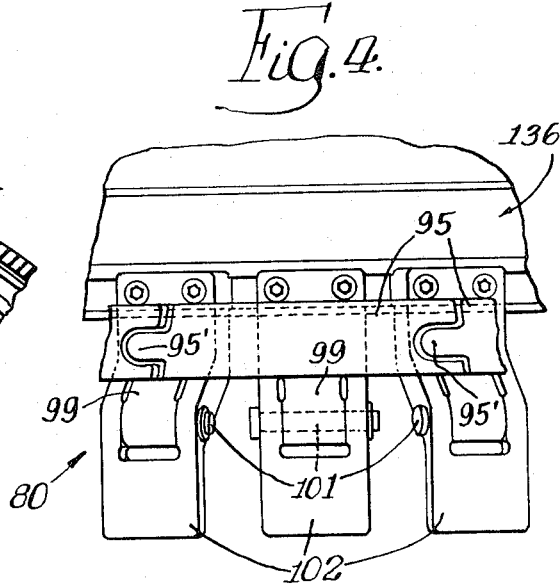

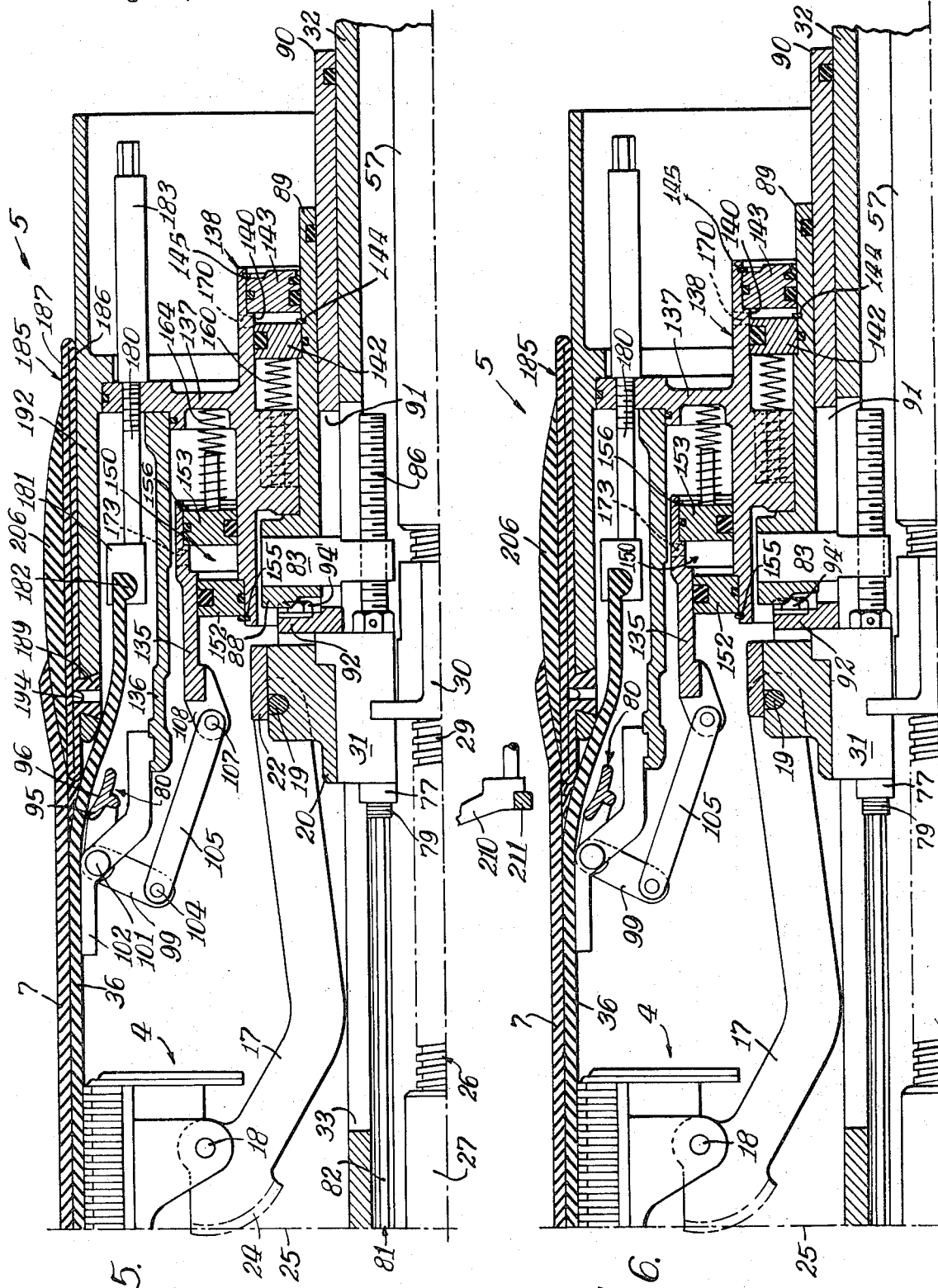

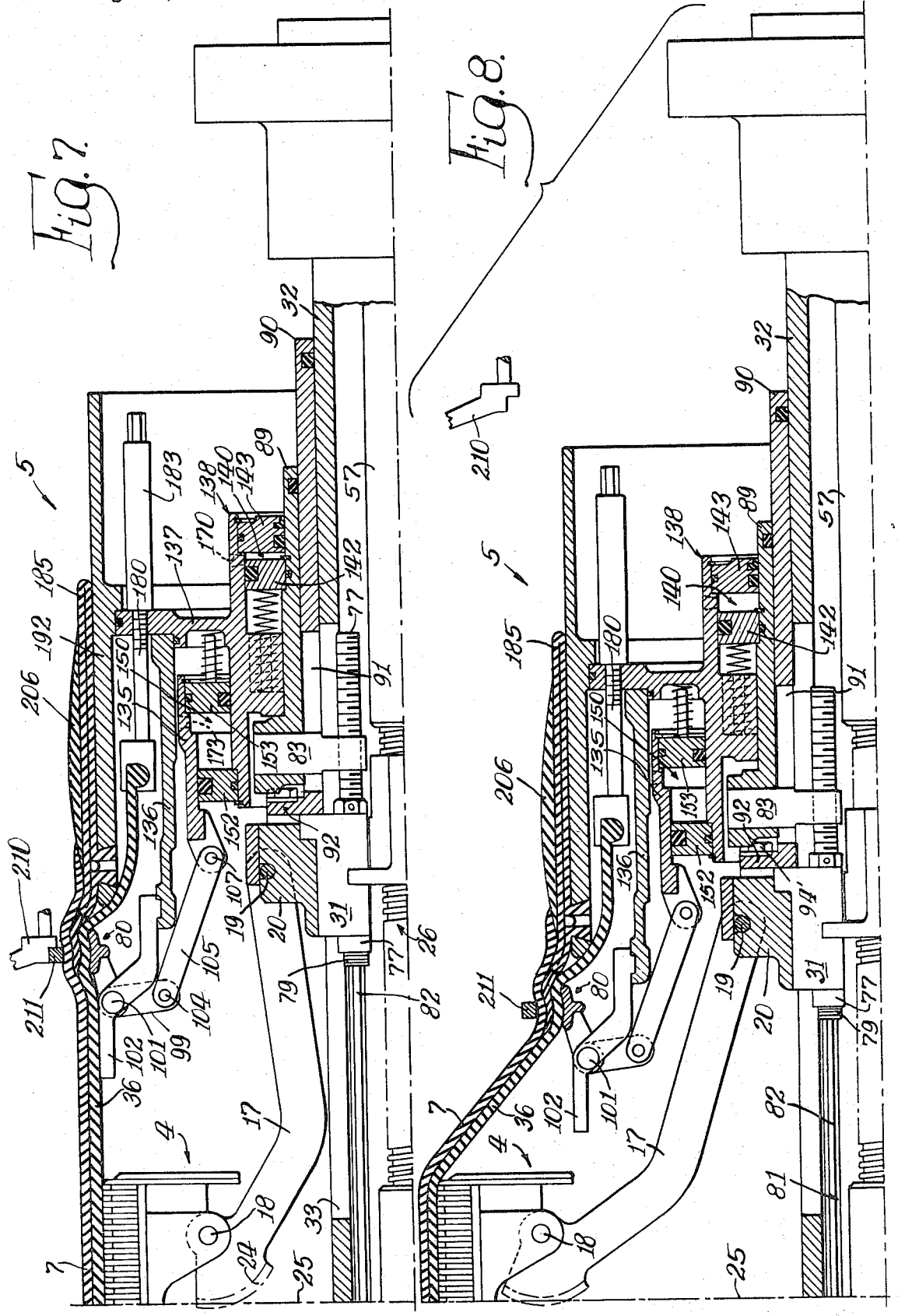

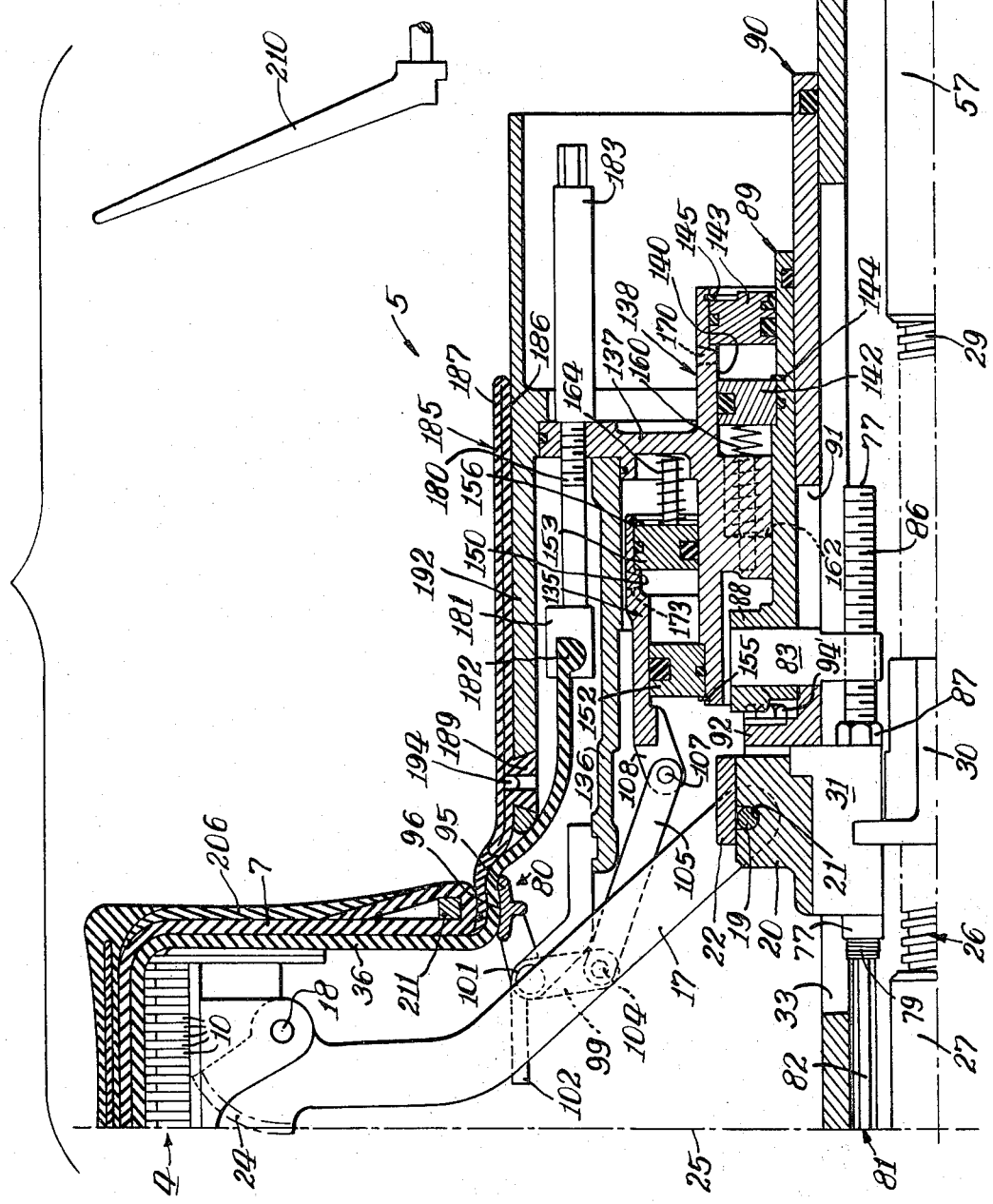

3,776,802
TIRE BUILDING APPARATUS
Edwin E. Mallory, Niles, Mich., and Emerson C. Bryant, South Bend, Ind., assignors to National-Standard Company, Niles, Mich.
Filed Aug. 23, 1971, Ser. No. 173,769
Int. Cl. B29h 17/12, 17/16
U.S. Cl. 156—420                                         18 Claims

ABSTRACT OF THE DISCLOSURE

A tire building apparatus embodying an expandable and contractable intermediate drum, end drum assemblies at opposite ends of the intermediate drum for supporting tire carcass material and tire bead supporting and locking means at the inner ends of the end drums in an arrangement including carrier means and in which the tire bead supporting and locking means may be positioned with respect to the carrier means in equidistant axially spaced apart relation with respect to the transverse centerline of the intermediate drum, and concentrically of the longitudinal axis of the apparatus, and in which the tire bead supporting and locking means in operative position lock tire beads inwardly of the ends of the tire carcass material.

A tire building apparatus, as noted, having such additional features as the provision of inflatable ply turn-up bag means carried by each of the end drum assemblies, in which the tire bead supporting and locking means in operative position lock the inner ends of inflatable ply turn-up bag means together with the outer ends of the tire carcass material at the tire beads together with the tire beads, and in which fluid is maintained under pressure within the apparatus upon inflation of inflatable bag pusher means to provide a reaction force for ply turn-up and the application of sidewall components to the tire carcass material after the latter has been formed into torus configuration or substantially that of the configuration of a completed tire.

BACKGROUND OF THE INVENTION

It is known prior to the present invention to provide tire building apparatus comprising an intermediate drum and end drum assemblies which in starting or initial positions thereof provide a substantially cylindrical surface for supporting tire carcass material in the form of a cylinder thereon. The intermediate drum may, for example, be of a construction embodying a plurality of circumferentially arranged deck segments each of which include a plurality of supporting members or blades extending in directions circumferentially of the drum, and which are in end-to-end interleaved relation between adjacent deck segments so that upon the outward radial displacement of the deck segments, the outer surfaces of the supporting members or blades define supporting surfaces of different radii or peripheral extend. Thus, after disposition of tire carcass material around the intermediate drum and with the end assemblies in their initial positions, the intermediate drum may be expanded to form the tire carcass material into substantially torus configuration approximating that of a completed tire for the application, for example, of breaker and tread components to the crown portion of the tire carcass. Alternatively, as is also known, breaker and tread components may be supported radially outwardly of the intermediate drum assembly so that upon radial expansion of the intermediate drum assembly the tire carcass material therearound is expanded and pressed against the breaker and tread components so supported. The supporting members or blades of the deck segments in the positions last noted provide a firm surface of desired peripheral extent supporting the tire carcass material enabling components such as breakers and tread components to be well stitched to the tire carcass.

A known tire building machine of the character noted has utility for building a tire carcass with tire beads of a given predetermined diameter over a range of axially spaced apart relationship with respect to each other.

Also, it is known in a general way to associate inflatable ply turn-up bag means and pusher means therefor to apply tire sidewall components to the side wall portions of the formed tire carcass material.

THE INVENTION

The invention comprehends a tire building apparatus having an intermedate drum assembly and end drum assemblies at opposite ends of the intermediate drum assembly which provides for supporting tire carcass material on the apparatus to form the tire carcass material into torus shape or that approximating a completed tire in which all components of the formed tire carcass, such as the outer periphery of the formed tire carcass and the tire beads, are all in true concentric and axially spaced apart relation.

The invention further comprehends the provision of tire bead supporting and locking means at the inner ends of the end drum assemblies which, in operative position, lock, in axially spaced apart relation and concentrically of the longitudinal axis of the apparatus, the outer ends of the tire carcass material together with the tire beads thereat. Additionally, the invention comprehends the provision of inflatable ply turn-up bag means carried by each of the ends drum assemblies, the inner ends of which in the operative position of the bead supporting and locking means clamp the outer ends of the tire carcass material together with the tire beads thereat.

The invention further comprehends the provision of means to introduce fluid under pressure internally of the apparatus to provide a reaction force in the application of the side wall components to the sides of the tire carcass material by inflatable ply turn-up bag means and pusher means when the tire carcass material has been formed into substantially torus configuration.

The intermediate drum of the apparatus of the present invention is of known construction and provides an outer surface of desired peripheral extent concentric about the longitudinal axis for the shaping of the tire carcass material, and which together with maintaining the tire beads concentric about the longitudinal axis and with the tire beads in equidistant axially spaced relation with respect to the transverse center axis of the intermedaite drum an extremely accurate tire may be constructed.

DESCRIPTION OF THE DRAWINGS

FIGS. 1a and 1b joined in end-to-end relation on the dotted centerline show a longitudinal sectional view of a tire building apparatus according to the present invention with parts in position for supporting tire carcass material for a radial type tire construction;

FIG. 2 is a vertical sectional view taken substantially along the line 3—3 of FIG. 1b looking in the direction indicated by the arrows;

FIG. 3 is a vertical sectional view taken substantially along the line 3—3 of FIG. 1b looking in the direction indicated by the arrows;

FIG. 4 is a plan view of the central portion of FIG. 3; and

FIGS. 5 through 11 show the upper right hand quadrant of the apparatus shown in FIG. 1b illustrating the sequence or positions of the intermediate drum assembly and the right drum assembly in fabricating a tire.

DESCRIPTION OF A PREFERRED EMBODIMENT OF THE INVENTION

Figure 1A:
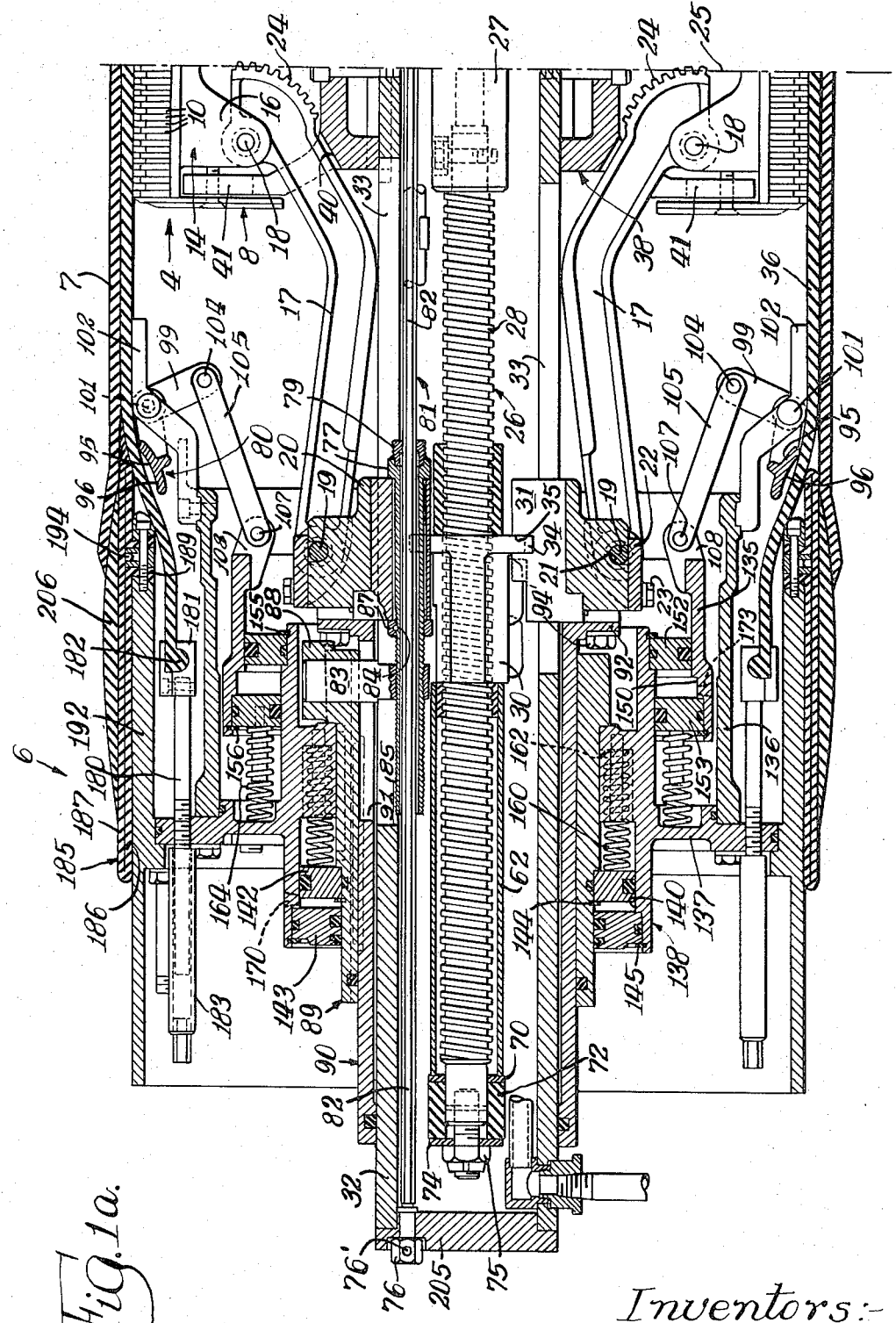

Referring now to FIGS. 1a and 1b of the drawings the tire building apparatus there shown comprises an intermediate expandable drum assembly 4 and inboard and outboard end drum assemblies 5 and 6 respectively.

The intermediate expandable drum assembly 4 as best seen in FIGS. 1a, 1b is of a construction shown and described in the copending application of Emerson C. Bryant, Ser. No. 4,285, filed Jan. 20, 1970, and the copending application of Larry C. Frazier and Emerson C. Bryant, Ser. No. 47,522, filed June 18, 1970, both of which applications are assigned to the assignee of the present application, and to which reference may be had.

The drum assembly 4 as disclosed in the foregoing applications comprises a plurality of circumferentially arranged platforms or deck segments 8. Each deck segment may typically include a plurality of supporting members or blades 10 extending circumferentially of the drum 4 and spaced apart in side-by-side relation in which they are in end-to-end interleaved relation between adjacent drum sections 8. In the fully expanded position of the expandable drum assembly 4, as best seen in dot-dash lines in FIG. 2, the adjacent end portion 12 of adjacent blades 10 preferably remain interleaved. Also as is known, the width of the deck segments 8 may be predetermined by the addition or subtraction of supporting members 10 preferably at the ends of the drum 4. Referring again to FIGS. 1a and 1b each deck segment 8 is formed with a bifurcated bracket 14 having radially inwardly extending opposed arm portions 16 between which the inner ends of pusher arms 17 are pivotally mounted as at 18. The pusher arms 17 lie in planes extending axially of the intermediate assembly 4, and at their outer ends are pivotally mounted as at 19 in axially spaced apart pusher means, such as pusher rings 20.

As shown the pusher rings 20 are formed with transversely extending substantially annular sockets 21 receiving the pivot pins 19, which pivot pins are retained in the sockets by retaining member 22 secured to the pusher ring 20 by bolts 23. The pusher arms 17 adjacent their inner ends are provided with identical meshing gear teeth 24 on the transverse centerline 25 of the intermediate drum assembly 4 perpendicular to the axis of the pusher rings 20.

The foregoing bracket 14, pusher arms 17, pusher rings 20 and associated components, together with a hollow outer shaft 32 within which inner shaft means 26 is arranged, define, in part, intermediate drum expanding and contracting means. In the intermediate drum expanding and contracting means shown in the drawings the inner shaft means 26 is formed with left and right hand threaded shaft sections 28 and 29 respectively, joined by collar 27 at their opposed inner ends for keying the two shafts together for conjoint rotation. Ball nuts 30 have threaded engagement with the threaded portion of each of the shafts 28 and 29, each of which carries diametrically opposed ball nut adapters 31 which extend through axially extending slots 33 disposed in diametrically opposed relation in the hollow shaft 32, with one such slot being provided for each of the ball nut adapters 31. The ball nut adapters 31 have the pusher ring means 20 secured thereto by end members 34 having, as seen in FIG. 3, cut-outs 35 within which the ends of the ball nut adapters 31 are received. Mounted centrally of the hollow shaft 32 is a guide block means 38 comprising a hub and slotted end flange members 41 at opposite ends of the hub of the guide block means. The guide block means 38 is provided with slots 40 which serve to guide or prevent circumferential movement of the adjacent outer portions of the pusher arms 17 in operation of the apparatus.

As before indicated FIGS. 1a and 1b show the position of the parts in the initial or starting position for forming tire carcass material 7 mounted on an elastic drum sleeve 36 extending between the inner ends of drum assemblies 5 and 6 into torus configuration or that approximating the shape of a completed tire. In the initial position of the parts, the inner screw means 26 has been suitably rotated by drive means including in part shaft means 57 to dispose the pusher rings 20 to their axially outermost positions with respect to each other.

After placement of the tire carcass material 7 in position as noted in connection with FIGS. 1a and 1b, the inner shaft means 26 is rotated to effect conjoint axial inward movement of the pusher rings 20 toward each other and at the same rate in which the meshing engagement of the gear teeth 24 radially expand the intermediate drum assembly to a position for progressively forming the intermediate portion of tire carcass material 7 and the drum sleeve 36 to a torus configuration and in the end positions thereof the tire carcass material 7 is in the form of a completed tire and at which the supporting members or blades 10 move radially and circumferentially relative to each other to provide a supporting surface for the intermediate drum assembly for the application of a breaker and tread cap as, for instance, by conventional stitching wheels or otherwise as aforedescribed. The expansion of the intermediate drum assembly may be to the maximum position as aforenoted, but if a tire of smaller diameter is desired it will be readily seen that the relative radial and circumferential movement of the supporting members 10 may be stopped at any desired radial position for forming cylindrical surfaces of different radii or peripheral extent for a desired diameter of a tire.

It will be observed that the slots 40 of the guide block means 38 and the radially outwardly slotted end flange members 41 prevent substantial circumferential movement of the guide arms 17 and add rigidity to the drum construction in a circumferential direction. The mesh of the gear teeth 24 in the position of the parts as shown in FIGS. 1a and 1b rigidly and accurately dispose the deck segments 8 with respect to each other so that the supporting members 10 define and act as a supporting surface of desired peripheral extent and symmetrical about the longitudinal axis of the drum for the tire carcass material. With the intermediate portion of the drum expanded to its outermost position, side walls in a manner to be described may be placed upon opposite sides of the expanded tire carcass.

In the specific illustrated form of the intermediate expandable drum 4 it should be noted that the gear teeth 24 are constantly in mesh, and as the deck segments 8 are consequently forced an equal distance radially outwardly on the axis 25 perpendicular to the axis of the pusher means 20, whereby the deck segments 8 remain substantially equidistant to the axis of the intermediate expndable drum 4. The gear teeth 24 are so developed so as to maintain the deck segments 8 in equidistant position resisting unequal roller pressures and also side presures, such as are present in the application of a breaker, treadcap and/or side wall components as may occur in conventional stitching operations.

Also in the intermediate drum assembly shown in the drawings, the guide slots 40 in the guide block means 38 and arms 41 serve as torsion guiding members for the pusher arms 17 and through them for the deck segments when it is desired to effect rotation of the intermediate assembly as, for example, in the stitching of a breaker and tread cap to the outer center periphery of the tire carcass material 7. The inner portion of FIG. 2 shows in full lines the intermediate drum assembly 4 in collapsed position to which it is returned after completion of the assembly of components for a tire with the geometry being such that the intermediate drum 4 and components at the inner ends of the drum assemblies 5 and 6 collapse together with the elastic drum sleeve 36 to enable removal of the completed assembly of tire components from the outboard end of the drum upon completion or retraction of the parts at the inner ends of the drum assemblies 5 and 6 to the position shown in FIGS. 1a and 1b.

In the outboard drum assembly 6 resilient stop means is provided and comprises a hollow sleeve 62 extending around the threaded shaft 28, and at its inner end abuts the adjacent ball nut 30, and at its outer end abuts the inner plate 70. A resilient member 72, for example, of polyurethane material or the like is disposed between inner plate 70 and outer plate 74 to provide a resilient stop means for arresting or defining the outward end position of the ball nuts 30 with respect to each other. The resilient stop assembly formed by the inner and outer plates 70 and 74 with the resilient material 72 therebetween is secured to the outer end of shaft 28 by a rotatable self-locking nut 75. Thus, as the result of maladjustment, switch failure or the like, any undue outward axial movement of the ball nuts 30 with respect to each other is gradually arrested to prevent any undesirable high stress in any of the components. The position of the resilient stop means above described may be readily adjusted by means of the self-locking nut 75.

A predetermined axially spaced apart position of a pair of bead supporting and locking means 80 at the inner ends of the end drum assemblies 5 and 6 is achieved by the provision of a single first carrier adjusting means 81 comprising: (a) continuous hex-shaped shaft 82, (b) threaded sleeves 85 and 86 journalled in ball nut adapters 31 and rotationally driven by insert 79 having mating hex bore with shaft 82, and (c) pins 83 having threaded engagement with sleeves 85 and 86 and extending radially outwardly through slots 33 of shaft 32 to engage first carrier sleeve means 89.

Nuts shown at 87 and 94 are adjusted along threaded sleeves 85 and 86 to minimize in conjunction with collar ends 77 the end play between sleeves 85 and 86 and ball nut adapters 31. Once adjusted nuts 87 and 94 are locked by pins 84. Shaft 82 is journalled in member 205 and retained by hex headed member 76 which is pinned at 76'.

As previously noted ball nut adapters 31 are assembled equidistant from the centerline 25. In assembling first carrier adjusting means 81 hex shaft 82 is inserted initially only through sleeve 85 and turned until end assembly 6 is the same distance from the centerline 25 as end assembly 5. The shaft 82 is then advanced through sleeve 86 and any further rotation of shaft 82 will cause equal movement of both sleeves 85 and 86 and therefore pins 83 with respect to ball nut adapters 31 and the centerline of the drum as well.

As best shown in FIG. 5 the pins 83 are mounted with the outer ends extending radially within and in engagement with bores therefor in flange means 88 of the first carrier sleeve means 89 mounted for relative axial sliding movement on quill sleeve means 90 having inner flanges 92 which are made fast to the outer end of ball nut adapters 31 by bolts 94'. Thus the first carrier sleeve means 89 are mounted for adjustable relative axial sliding movement on quill sleeve means 90 to fixed adjusted position equidistant to the transverse centerline of intermediate drum 4 by reason of the quill 90 being slotted as at 91 to provide for the aforementioned predetermined axial positioning of pins 83 in both end drum assemblies.

As the ball nuts 30, pusher rings 20 and quill sleeve means 90 are axially driven toward and away from the vertical centerline 25 of the drum to operate the expansion and contraction of the intermediate drum assembly 4, the quill means 90 carry along with them the first carrier sleeve means 89. However, as noted by the use of right and left hand adjusting screws 85 and 86 the first carrier sleeve means 89 may be adjusted on the quill sleeve means 90. Thus it will be readily appreciated that by adjusting the first carrier sleeve means 89 axially outwardly on quill sleeve means 90 the effect will be to increase the bead set dimension of the bead supporting and locking means 80 for the drum.

The bead supporting and locking means 80, again as best seen in FIG. 5, comprise a plurality of circumferentially arranged clamping members 95 having outer concave or other suitable surfaces 96. The outer ends of bead supporting and locking means 80 are constructed with interlocking protrusion means best shown in FIG. 4 at 95' which allow the bead supporting and locking means to expand radially to clamp the materials to the inside surface of the beads and still not form gaps. Thereby each radial cord of the ply material is locked to the bead. Referring again to FIG. 5 the clamping members 95 are formed at the outer ends of bell cranks 99 pivotally mounted intermediate their ends, as at 101, to arm members 102. The ends of the bell crank 99 opposite clamp members 95 are pivotally connected, as at 104, to the axial inner ends of link means 105 which, in turn, at their other ends are pivotally connected, as at 107, to end bracket ears 108 of locating cylinder means 135. The outer ends of arm members 102 are mounted on annular sleeves 136 which at their other ends are secured to radially outwardly extending flanges 137 of second carrier sleeve means 138. The first and second carrier sleeve means 89 and 138, respectively, define first cylinder means 140 therebetween in which piston 142 and end cap 143 are disposed and retained in position by locking rings 144 and 145, respectively. Second cylinder means 150 is formed between portions of locating cylinder means 135 and second carrier sleeve means 138, within which piston 152 and end cap 153 are disposed and retained in position by locking rings 155 and 156, respectively. First coil spring means 160 is disposed between the piston 142 of the first cylinder means and seat 162 in member 138 and serves, when the drum is collapsed, to hold the inner end of second carrier sleeve means in engagement with the outer surface of flange means 88 of first carrier sleeve means 89. Also, second coil spring means 164 are arranged between the outer ends of second cap means 153 of the second cylinder means 150 and the flanges 137 of second carrier sleeve means 138 to provide for the spring return of the bead supporting and locking means 80 as will be further described below.

Suitable seals are provided for first and second cylinder means described to prevent escape or leakage of fluid therefrom. It will be noted that with respect to first cylinder means 140 there is provided a fluid pressure connection, diagrammatically illustrated at 170, between piston 142 and end cap 143. A fluid pressure inlet, also diagrammatically shown, is provided at 173 between piston means 152 and end cap 153 in the second cylinder means 150.

The elastic drum sleeve 36, previously mentioned, if desired may have embedded therein steel wire or other material of high tensile strength to prevent elongation of the sleeve in the successive formation of tire carcass materials supported on the sleeve into torus configuration.

It will be seen that the elastic drum sleeve 36 at its opposite ends is secured in position by threaded studs 180 which, at their inner ends, are secured to end ring means 181 in which enlarged annular end portions 182 of the elastic drum sleeve 36 are mounted. The studs 180 have threaded engagement with the threaded adjusting sleeves 183 for adjusting the axially spaced apart positions of the ring members 181 for purposes of tensioning the sleeve 36.

As before mentioned, and as will be best understood again upon reference to FIG 5, each end drum assembly provides for the support of an inflatable ply turn-up bag means 185. Each ply turn-up bag means is of envelope configuration and comprises inner and outer layers of rubber as shown at 186 and 187 respectively, which, if desirable, may also be axially reinforced by steel wires or other material of high tensional strength. Inwardly of each of the inner ends of the inflatable ply turn-up bag means 185 the inner layers 186 of the ply turn-up bag means is formed with a truncated portion 189 having a sung fit with a correspondingly formed groove in an annular end drum frame member 192 which encases the aforedescribed anchoring means for the elastic sleeve 36 and the various components previously described in each of the end drum assemblies. The truncated portions 189 are ported, as shown at 194, for admitting fluid under pressure into the inflatable ply turn-up bag means 185 to effect inflation of the same and also for release of fluid under pressure for deflation of the inflatable ply turn-up bag means 185. Also it will be seen that the innermost ends of the inflatable ply turn-up bag means 185 are tapered and are adapted to lie between the portions of the elastic drum sleeve 36 inwardly of end drum assemblies and between tire carcass material at the positions at which tire beads, as seen in FIG. 6, are adapted to be located prior to forming the tire carcass material into torus configuration. Suitable seals are provided throughout the end drum assemblies so as to provide a closed interior chamber for the apparatus into which fluid under pressure is adapted to be admitted and released through a fluid port diagrammatically shown, in FIG. 1b, at 202 at the end of the drive shaft means 57. As will be seen in FIG. 1a the outboard end of drum assembly 6 is provided with a closed end wall 205 for sealing or closing off the opposite end of the quill shaft 32.

It will be understood that the foregoing apparatus is provided with conventional bead placer and pusher ring means which will be shown and described in the following description concerning the operation of the above described apparatus.

OPERATION OF THE AFOREDESCRIBED APPARATUS

Referring now to FIGS. 1a, 1b and 5 the several parts are in their initial starting positions in which the bead supporting and locking means 80 have been adjusted, as before described, to a desired position equidistant of the vertical median axis 25 of the intermediate drum assembly 4. The bead supporting and locking means are disposed in their radial inoperative positions. Thus in this position of the parts the tire carcass material 7 is applied over the intermediate drum assembly 4 and over side wall components 206 disposed upon the outer surfaces of the inflatable ply turn-up bag means 185 with the inner peripheral edges of the side walls 206 being disposed inwardly of the outer end portions of the tire carcass material 7 and with the inner tapered end portions of the inflated ply turn-up bag means 185 being disposed upon the carcass material to lie radially outwardly of the tire bead supporting and locking means 80. Other components desired for the tire carcass material may also be assembled with the parts of the apparatus in the position shown in FIGS. 1a, 1b and 5.

Turning now to FIG. 6 a conventional tire bead placing and pusher ring means 210 has a tire bead 211 mounted therein and is moved from a position axially outwardly of the end drum assemblies to the position shown in FIG. 6 for supporting the tire bead radially outwardly of the tire bead supporting and locking means 80. It will be understood that the foregoing is also true of the end drum assembly 6 and the following description, while limited to drum assembly 5, is also true of drum assembly 6.

With a tire bead 211 thus supported the tire bead supporting and locking means 80 are actuated by admitting fluid under pressure into the second cylinder means 150 which, through the components previously described, effects outward pivotal movement of the bell crank 99 to engage the concave inner surfaces 96 with the elastic drum sleeve 36 thereat clamping the carcass material and the inner end of the ply turn-up bag means 185 with tire bead 211 supported by the tire bead placing and bag turn-up means 210. Thus in the position of FIG. 7 the tire beads are locked in position from inside the drum in appropriately spaced apart axial relationship, and after which the tire bead placing and ply bag turn-up means 210 is withdrawn to retracted position as shown in FIG. 8 and radial expansion of the intermediate drum assembly is initiated as before described. The tire beads are at this time locked with the tire carcass material substantially flat so that during the shaping operation described below the tire bead to tire bead periphery stays constant.

As shown in FIG. 8 pressure is maintained in cylinder 150 to continue to lock the tire cords and the tire carcass material to the tire beads and maintain the periphery of the tire true. Further, air is introduced into cylinder 140 to keep the materials taut as the tire carcass material is expanded.

The expansion of the intermediate drum assembly 4 is continued with pressure maintained in both cylinders 140 and 150 until the tire carcass material is formed into substantially torus configuration.

Figure 9:
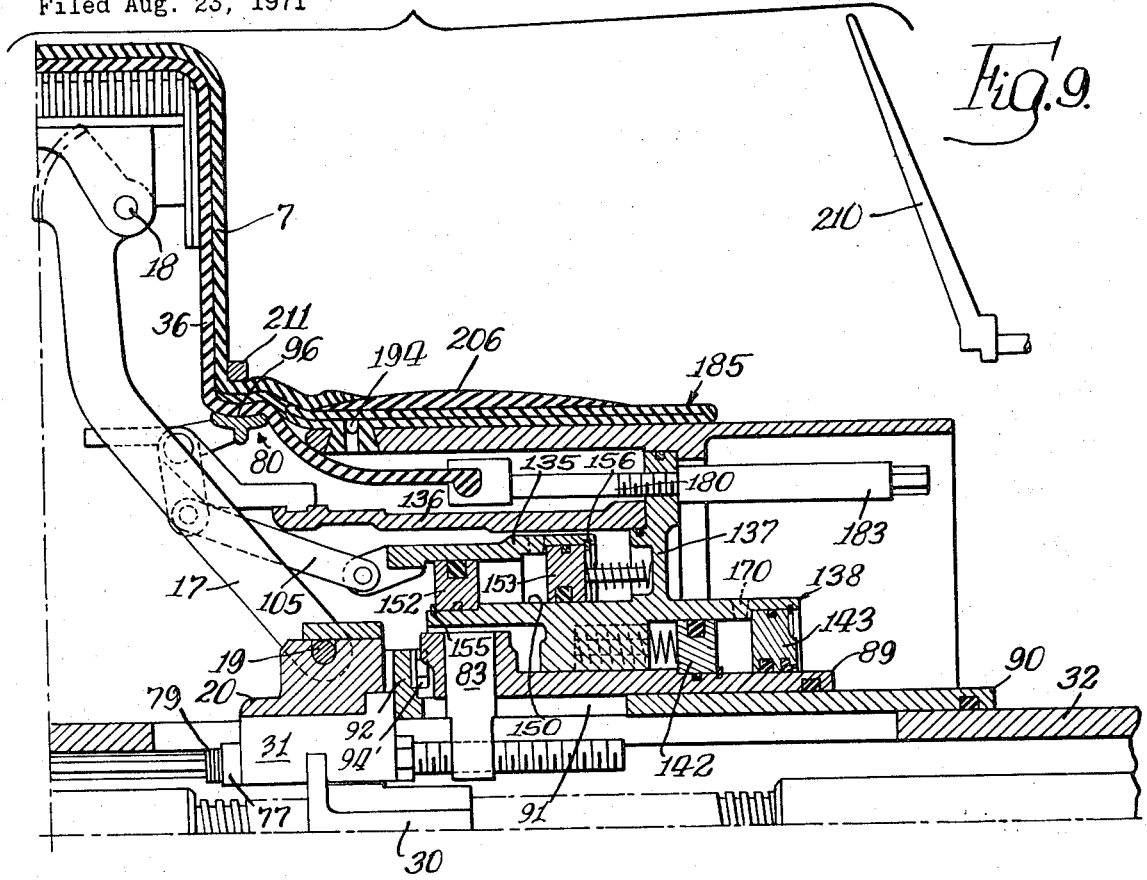
Figure 10:
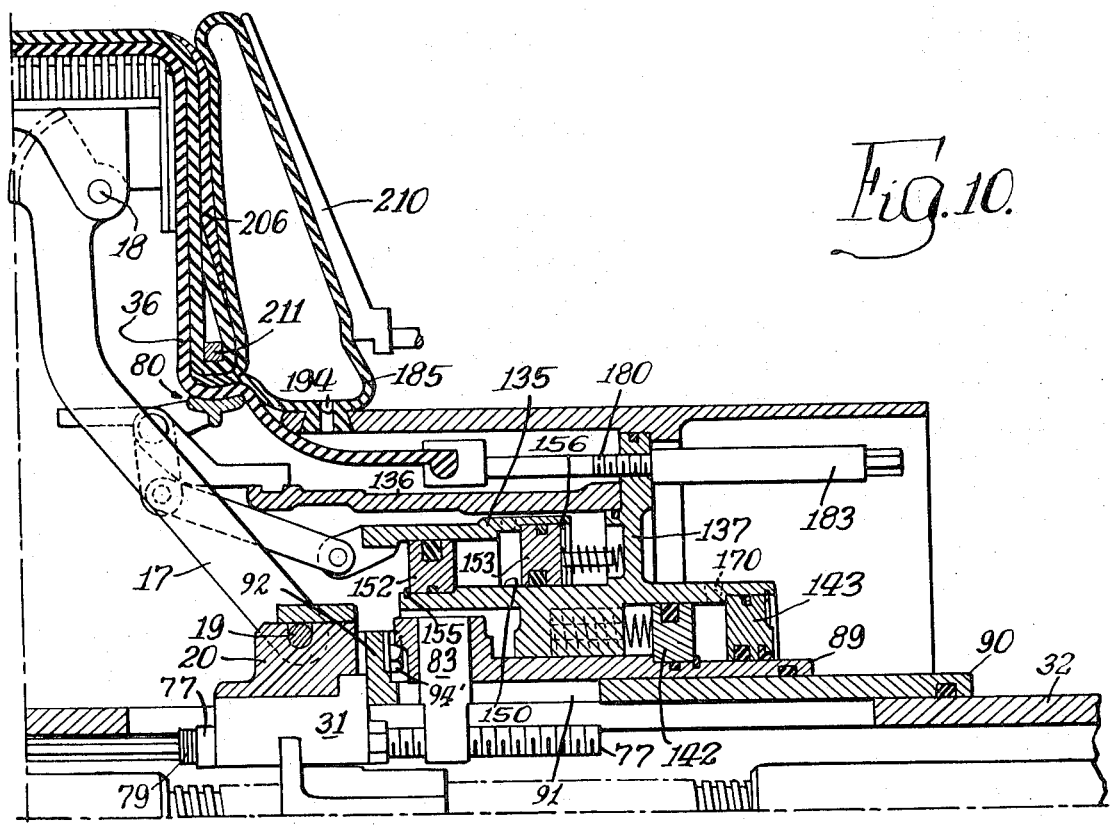

As seen in FIG. 9 after completion of the formation of the tire carcass material into substantially torus configuration while still maintaining the second cylinder means 150 and port 170 under pressure, fluid under pressure is admitted through port 194 to inflate ply turn-up bag means 185, as shown in FIG. 10, and in which the tire bead placing and bag turn-up means 210 is advanced to engage the bag to effect turning up of the outer end portion of the tire carcass material to encase tire bead 211 and apply the side wall component to the side of the tire carcass material now of torus configuration. Since the ply turn-up bags are axially reinforced the side wall material placed on the bags in flat condition the side wall components are accurately placed for ply turn-up and side wall placement.

After application of the side wall component and, as shown in FIG. 11, the tire bead placing and ply bag turn-up means 210 is retracted to its inoperative positions and, as shown in FIG. 11, breaker and tread components may be applied to the crown of the tire carcass material which, in the particular arrangement shown in FIG. 11, provides a tread over side wall construction. It will be understood, however, that if desired the breaker and tread strips may be applied before application of the side walls and the side walls thereafter applied so as to provide a side wall over tread tire construction. It will be seen that the true radial concentricity of the breaker and tread is maintained since all of the tire components are mechanically held at this point. While encasing the tire beads and the application of the side wall components, the interior of the drum apparatus is placed under pressure, as by admitting fluid under pressure through the port 202 at the outer end of drive shaft 57, as shown in FIG. 1b, to provide a reaction force for the final stitching of the tire bead placing and ply turn-up bag means 210 in applying or stitching the side wall components to the shaped tire carcass. After application of the side wall components the ply turn-up bag means is deflated and returned to the position shown in FIG. 11.

After completion of the construction of a tire carcass as above described, fluid under pressure from first and second cylinder means 140 and 150 may be released to initiate the return of the several parts to the positions shown in FIGS. 1a, 1b and 5 to enable removal of the formed tire carcass by axially moving the same outwardly over an end of the drum assembly. Thereafter, of course, the tire may be cured in a conventional curing mold to form a completed tire. In the foregoing operation the tire beads are unable to rotate so that each wire of the tire beads carries an equal load and provides a highly uniform tire.

While there has been shown and described a preferred embodiment of the invention it will be understood that various modifications and rearrangements may be made therein without departing from the spirit and scope of the invention.

The invention claimed is:

1. In a tire making apparatus having an intermediate expandable drum mounted on a longitudinally extending main shaft intermediate the ends thereof, end drum assemblies one at each end of said intermediate drum assembly, said intermediate expandable drum and said end drum assemblies providing for the rigid support of tire carcass material thereon, and axially movable intermediate drum expanding and contracting means including sleeve means mounted on said main shaft for axial inward and outward movement thereon and providing for the support of said end drum assemblies for movement in only the axial direction toward and away from the opposite ends of said intermediate expandable drum upon expansion and contraction thereof, the combination therewith of carrier means for said end drum assemblies associated with said sleeve means for movement axially therewith and axially relative thereto, tire bead supporting and locking means associated with said carrier means, means associated with said carrier means for moving said tire bead supporting and locking means to operative and inoperative positions in the contracted position of said intermediate expandable drum, said tire bead supporting and locking means in operative position being adapted to lock tire beads in axially spaced apart relation and concentrically of the longitudinal axis of the apparatus adjacent the outer ends of the tire carcass material surrounding said intermediate drum and the inner ends of said end drum assemblies, and said carrier means upon movement thereof relative to said sleeve means maintaining the tire carcass material taut between the locked tire beads during the expansion of said intermediate drum.

2. The tire making apparatus of claim 1 characterized by the provision of an inflatable ply turn-up bag means carried by each of said end drum assemblies.

3. The tire making apparatus of claim 2 in which the inner ends of the inflatable ply turn-up bag means in the operative position of said bead supporting and locking means are clamped together with the outer ends of the tire carcass material at said tire beads.

4. The tire building apparatus of claim 2 in which said inflatable ply turn-up bag means are adapted to support side wall components, an inflatable bag pusher means adapted upon inflation thereof to apply the tire sidewall components to the tire carcass material when shaped to torus configuration after axial movement of said axially movable intermediate drum expanding and contracting means to form the tire carcass material into substantially torus configuration approximating that of a completed tire.

5. The tire making apparatus of claim 4 characterized by the provision of means to introduce fluid under pressure internally of the apparatus to provide a reaction force to the application of said side wall components to the sides of said tire carcass by said inflatable bag pusher means.

6. The tire making apparatus of claim 1 characterized by an elastic sleeve encasing said intermediate expandable drum and being anchored at its opposite ends in said end drum assemblies.

7. The tire making apparatus of claim 6 characterized by said bead supporting and locking means having inner concave surfaces for engaging the adjacent inner surface of said elastic sleeve at the tire beads.

8. In a tire making apparatus having an intermediate expandable drum mounted on a longitudinally extending main shaft intermediate the ends thereof, end drum assemblies one at each end of said intermediate drum, said intermediate expandable drum and said end drum assemblies providing for the support of tire carcass material thereon, and axially movable intermediate drum expanding and contracting means including sleeve means mounted on said main shaft for axial inward and outward movement thereon and providing for the support of said end drum assemblies for movement in only the axial direction toward and away from the opposite ends of said intermediate expandable drum upon expansion and contraction thereof, the combination therewith of first carrier means mounted on said sleeve means, second carrier means mounted on said first carrier means for movement axially therewith and axially relative thereto, tire bead supporting and locking means associated with said second carrier means, means for axially adjusting the position of said first carrier means on said sleeve means and thereby dispose said tire bead supporting and locking means in predetermined equidistant positions with respect to the transverse center line of said intermediate expandable drum and concentric with said main shaft, means associated with said second carrier means for moving said tire bead supporting and locking means to operative and inoperative positions in the contracted position of said intermediate expandable drum, said tire bead supporting and locking means in operative position being adapted to lock tire beads in axially spaced apart relation and concentrically of the longitudinal axis of the apparatus adjacent the outer ends of the tire carcass material surrounding said intermediate drum and the inner ends of said end drum assemblies, and said second carrier means upon movement thereof relative to said first carrier means maintaining the tire carcass material taut between the locked tire beads during the expansion of said intermediate drum.

9. The apparatus of claim 8 characterized by an elastic sleeve encasing said intermediate expandable drum and being anchored at its opposite ends in said end drum assemblies.

10. The tire making apparatus of claim 8 characterized by the provision of an inflatable ply turn-up bag means carried by each of said end drum assemblies.

11. The tire making apparatus of claim 8 in which the inner ends of the inflatable ply turn-up bag means are, in the operative position of said bead supporting and locking means, clamped together with the outer ends of the tire carcass material at said tire beads.

12. The tire building apparatus of claim 8 in which said inflatable ply turn-up bag means are adapted to support tire side wall components, and inflatable bag pusher means adapted upon inflation thereof to apply tire side wall components to the tire carcass material when shaped into torus configuration.

13. The tire building apparatus of claim 12 characterized by the provision of means to introduce fluid under pressure internally of the appratus to provide a reaction force for ply turnup and the application of said tire side wall components to the sides of said tire carcass by said inflatable bag pusher means.

14. The tire building apparatus of claim 9 characterized by said bead supporting and locking means having inner concave surfaces for engaging the adjacent inner surface portions of said elastic sleeve at the tire beads.

15. The tire building apparatus of claim 14 including means for adjusting the positions of the anchored ends of said elastic sleeve in said end drum assemblies.

16. In a tire making apparatus having an intermediate drum embodying axially movable intermediate drum expanding and contracting means for disposing the intermediate drum in positions defining rigid supporting surfaces of different radii, the combination therewith of an end drum assembly at each end of said intermediate drum, and tire bead supporting and locking means mounted at the inner ends of said end drum assemblies comprising a plurality of circumferentially arranged clamping members having interlocking protrusions between the ends of adjacent clamping members to provide for radial displacement of said clamping members without forming gaps therebetween.

17. The tire making apparatus of claim 8 in which said first carrier means are movable simultaneously toward and away from each other for adjusting said end bead assemblies.

18. The tire making apparatus of claim 2 in which said inflatable ply turn-up bag means have axially reinforcing cords associated therewith.

References Cited
UNITED STATES PATENTS

| | | | |
|---|---|---|---|
| 3,125,482 | 3/1964 | Niclas et al. | 156—398 X |
| 3,598,673 | 8/1971 | Caretta | 156—132 |
| 3,674,604 | 7/1972 | Gazuit | 156—416 |
| 3,360,418 | 12/1967 | Novikov | 156—400 |
| 2,614,952 | 10/1952 | Kraft | 156—132 X |
| 3,188,260 | 6/1965 | Nebout | 156—415 |
| 3,374,138 | 3/1968 | Porter et al. | 156—132 X |
| 3,489,634 | 1/1970 | Pizzo et al. | 156—398 |
| 3,645,818 | 2/1972 | Frazier | 156—132 X |

ALFRED L. LEAVITT, Primary Examiner

C. B. COSBY, Assistant Examiner

U.S. Cl. X.R.

156—135, 401

PO-1050
(5/69)

UNITED STATES PATENT OFFICE
CERTIFICATE OF CORRECTION

Patent No. 3,776,802    Dated December 4, 1973

Inventor(s) Edwin E. Mallory and Emerson C. Bryant

It is certified that error appears in the above-identified patent and that said Letters Patent are hereby corrected as shown below:

Column 10, line 32, change "claim 8" to --claim 10--.

Column 10, line 37, change "claim 8" to --claim 10--.

Column 10, line 50, change "claim 9" to --claim 8--.

Signed and sealed this 16th day of April 1974.

(SEAL)
Attest:

EDWARD M. FLETCHER, JR.
Attesting Officer

C. MARSHALL DANN
Commissioner of Patents